United States Patent [19]

Marsh et al.

[11] Patent Number: 4,586,973
[45] Date of Patent: * May 6, 1986

[54] METHOD OF MAKING BELT

[75] Inventors: Richard L. Marsh; Robert E. Wetzel, both of Springfield, Mo.

[73] Assignee: Dayco Corporation, Dayton, Ohio

[*] Notice: The portion of the term of this patent subsequent to Mar. 12, 2002 has been disclaimed.

[21] Appl. No.: 691,241

[22] Filed: Jan. 14, 1985

Related U.S. Application Data

[62] Division of Ser. No. 502,777, Jun. 9, 1983, Pat. No. 4,504,342.

[51] Int. Cl.⁴ .................... B29H 7/22; F16G 1/00
[52] U.S. Cl. ....................... 156/140; 156/137
[58] Field of Search ............ 156/140, 141, 138, 139, 156/137; 474/205

[56] References Cited

U.S. PATENT DOCUMENTS 3,078,206  2/1963  Skura ............................ 156/140
3,404,578 10/1968  Koch et al. ..................... 474/205
3,535,946 10/1970  Miller ............................ 474/205
4,235,119 11/1980  Wetzel ........................... 474/205

FOREIGN PATENT DOCUMENTS 5584622 1/1982 Japan .
58-91947 1/1983 Japan .

Primary Examiner—Michael Ball
Attorney, Agent, or Firm—Joseph V. Tassone

[57] ABSTRACT

A belt construction and method of making the same are provided, the belt construction comprising a tensile member intermediate the opposed sides of the belt construction, a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth and is substantially free of fibers therein, the material of the backing member having a surface that joins with a surface of each tooth whereby the joining surfaces define an interface line therebetween, the interface line for each tooth extending from the tensile member at a point inboard of one of the opposed sides of the respective tooth into the medial portion of the respective tooth and then back to the tensile member at a point inboard of the other of the opposed sides of the respective tooth whereby part of the material of the backing member defines part of the medial portion of each tooth, the surface of the backing member also joining with a surface of the first material in each land area whereby the joining surfaces in each land area define an interface line therebetween, the interface line in each land area having a portion thereof disposed spaced from the tensile member on the side thereof opposite to the side thereof that faces toward the teeth.

12 Claims, 8 Drawing Figures

METHOD OF MAKING BELT

CROSS REFERENCE TO RELATED APPLICATION

This application is a divisional patent application of its copending parent patent application, Ser. No. 502,777, filed June 9, 1983, now U.S. Pat. No. 4,504,342.

BACKGROUND OF THE INVENTION

1. Field of the Invention

This invention relates to an improved belt construction and to a method of making the same.

2. Prior Art Statement

It is known to provide a belt construction having opposed sides and comprising a tensile member intermediate the opposed sides, a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth and is substantially free of fibers therein, the material of the backing member having a surface that joins with a surface of each tooth whereby the joining surfaces define an interface line therebetween, the interface line for each tooth extending from the tensile member at a point inboard of one of the opposed sides of the respective tooth into the medial portion of the respective tooth and then back to the tensile member at a point inboard of the other of the opposed sides of the respective tooth whereby part of the material of the backing member defines part of the medial portion of each tooth, the surface of the backing member joining with a surface of the first material in each land area whereby the joining surfaces in each land area define an interface line therebetween. For example, see the U.S. Pat. No. to Wetzel, 4,235,119.

It is also known to form a belt construction that has teeth on one side thereof by providing a grooved drum, disposing a tensile member about the drum, then disposing a polymeric backing material about the tensile member, and then subjecting the drum to heat and pressure to cause the material to be forced toward the drum whereby the material exudes through the tensile member adjacent the grooves and enters the grooves to form the belt teeth. For example, see the U.S. Pat. No. to Skura, 3,078,206.

While the U.S. Pat. No. to Miller, 3,535,946 does not state that the backing material thereof is formed of a plurality of layers that are initially separate and are respectively exuded through the tensile member in the same manner as the aforementioned patent to Skura, U.S. Pat. No. 3,078,206, FIG. 3 of the patent to Miller illustrates an interface line between fiber containing material and non-fiber containing material that extends from a point in the land area of the belt construction that is spaced beyond one side of the tensile member and into each tooth beyond the other side of the tensile member before returning back to the next adjacent land area.

SUMMARY OF THE INVENTION

It is one feature of this invention to provide an improved belt construction wherein the teeth thereof are less likely to be sheared therefrom along the tensile member of such belt construction.

In particular, it was found according to the teachings of this invention that the interface line between the fiber containing polymeric material that forms the outside portion of each tooth, such as in the aforementioned patent to Wetzel, U.S. Pat. No. 4,235,119, should extend in spaced relation to the other side of the tensile member when the interface line extends into the adjacent land area between the teeth rather than extend intermediate the opposed sides of the tensile member as in the patent to Wetzel, U.S. Pat. No. 4,235,119. In this manner, the interface line in the belt construction of this invention extends through the tensile member only at the points thereof inboard of the adjacent opposed sides of each tooth and at an angle to the longitudinal axis of the tensile member.

For example, one embodiment of the belt construction of this invention has opposed sides and comprises a tensile member intermediate the opposed sides, a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth and is substantially free of fibers therein. The material of the backing member has a surface that joins with a surface of each tooth whereby the joining surfaces define an interface line therebetween, the interface line for each tooth extending from the tensile member at a point inboard of one of the opposed sides of the respective tooth into the medial portion of the respective tooth and then back to the tensile member at a point inboard of the other of the opposed sides of the perspective tooth whereby part of the material of the backing member defines part of the medial portion of each tooth. The surface of the backing member also joins with a surface of the first material in each land area whereby the joining surfaces in each land area define an interface line therebetween, the interface line in each land area having a portion thereof disposed spaced from the tensile member on the side thereof opposite to the side thereof that faces toward the teeth.

It was also found according to the teachings of this invention that such a belt construction can be formed by utilizing the general method and apparatus disclosed in the aforementioned patent to Skura, U.S. Pat. No. 3,078,206 because it is found that the polymeric material that has the reinforcing fibers therein can be exuded through the tensile member in a manner similar to the disclosed use of the Skura method and apparatus in the aforementioned U.S. Pat. No. to Miller, 3,535,946.

For example, it was found according to the teachings of this invention that the aforementioned belt construction of this invention can be made by providing a grooved drum, disposing the tensile member about the drum, then disposing the first polymeric material about the tensile member, then disposing the second polymeric material about the first polymeric material, and then subjecting the drum to heat and pressure to cause the material to be forced toward the drum whereby the first material exudes through the tensile member adjacent the grooves and into the grooves and the second material exudes through the tensile member adjacent the grooves and into the grooves to define the interface line for each tooth.

Accordingly, it is an object of this invention to provide an improved belt construction having one or more of the novel features of this invention as set forth above or hereinafter shown or described.

Another object of this invention is to provide an improved method of making such a belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
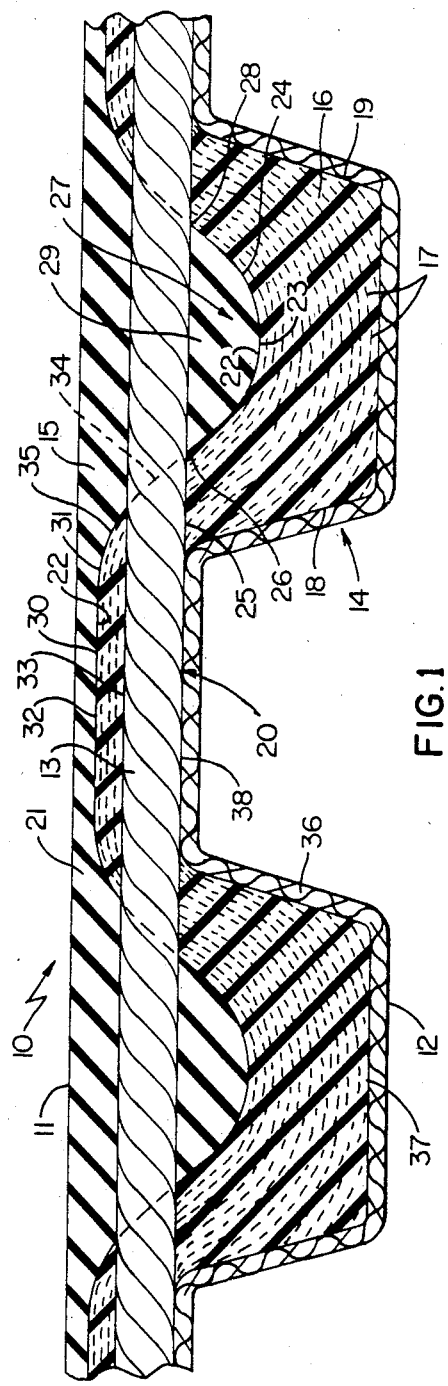
FIG. 1 is an enlarged, fragmentary, cross-sectional view illustrating one embodiment of the improved belt construction of this invention.

While the various features of this invention are hereinafter illustrated and described as being particularly adapted to provide belt constructions formed of particular materials, it is to be understood that the various features of this invention can be utilized singly or in various combinations thereof to provide belt constructions formed of other materials, as desired.

Therefore, this invention is not to be limited to only the embodiments illustrated in the drawings, because the drawings are merely utilized to illustrate some of the wide variety of uses of this invention.

Referring now to FIG. 1, one embodiment of the improved belt construction of this invention is generally indicated by the reference numeral 10, the belt construction 10 having opposed sides 11 and 12 and comprising a tensile member or means 13 disposed intermediate the opposed sides 11 and 12, a plurality of teeth that are generally indicated by the reference numeral 14 and defining the side 12 of the belt construction, and a backing member 15 defining the side 11 of the belt construction.

While the tensile section 13 of the belt construction 10 can comprise any suitable structure, the embodiment thereof illustrated in the drawings comprises a plurality of side-by-side cord strands formed of substantially non-stretchable polymeric material in a manner conventional in the belt making art as will be apparent hereinafter and therefore the terms "tensile member" will be hereinafter utilized for describing the tensile section 13 of the belt construction 10.

The teeth 14 of the belt construction 10 are mainly formed of a first polymeric material 16 that has reinforcing fibers 17 therein, each tooth 14 having opposed sides 18 and 19 that are disposed in spaced relation to adjacent sides 19 and 18 of adjacent teeth 14. The sides 18 and 19 of each tooth 14 are shown as being flat and angled relative to the longitudinal axis of the belt construction 10 that is disposed parallel to the tensile member 13 and can comprise the driving or driven parts of the teeth 14 in a manner well known in the art. However, it is to be understood that the cross-sectional configuration of the teeth 14 can have any other suitable profile rather than being substantially trapezoidal as illustrated in FIG. 1, if desired.

The belt construction 10 has land areas that are generally indicated by the reference numeral 20 in FIG. 1 and are respectively disposed between adjacent teeth 14 as is conventional in the art.

The backing member 15 of the belt construction 10 is mainly formed from a second polymeric material 21 that is initially separate from the material 16 of the teeth 14 and is substantially free of reinforcing fibers therein, the material 21 of the backing member 15 having a surface 22 that joins with a surface 23 of each tooth whereby the joining surfaces 22 and 23 define an interface line 24 therebetween.

The interface line 24 for each tooth 14 extends from one side 25 of the tensile member 13 at a point 26 inboard of the opposed side 18 of the respective tooth 14 into the medial portion of the respective tooth 14 that is generally indicated by the reference numeral 27 and then back to the side 25 of the tensile member 13 at a point 28 that is inboard of the other opposed side 19 of the respective tooth. In this manner, a part 29 of the material 21 of the backing member 15 defines part of the medial portion 27 of each tooth 14.

The interface line 24 for each tooth 14 is substantially arcuate between the points 26 and 28 thereof in a manner similar to the interface line for each tooth of the belt construction set forth in the aforementioned U.S. Pat. No. to Wetzel, 4,235,119, whereby this patent is being incorporated into this disclosure by this reference thereto.

The surface 22 of the backing member 15 also joins with a surface 30 of the first material 16 in each land area 20 whereby the joining surfaces 22 and 30 in each land area 30 define an interface line 31 therebetween.

The interface line 31 in each land area 20 of the belt construction 10 of this invention has a portion 32 that is disposed spaced from the side 33 of the tensile member 13 and is generally parallel thereto, the interface line 31 of each land area 20 joining with the interface lines 24 of each tooth 14 adjacent thereto by a portion 34 thereof that extends between the opposed sides 25 and 33 of the tensile member 13 through the spaces between adjacent cord strands of the tensile member 13 as will be apparent hereinafter, the interface line 31 having opposed arcuate portions 35 in each land area 20 joining the substantially straight portion 32 thereof with the opposed intermediate portions 34 thereof as illustrated.

In this manner, it can be seen that the interface line 24 for each tooth 14 of the belt construction 10 of this invention, as well as the major portion 32 of the interface line 31 for each land area 20 of the belt construction 10, is disposed spaced from the tensile member 13 so as to remove any tendency of a shearing effect to take place at such interface lines 24 and 31 along the tensile member 13 as the only portions 34 of the interface lines 24 and 31 between the materials 16 and 21 that actually engage the tensile member 13 are disposed at an angle relative to the longitudinal axis of the tensile member 13 and, thus, would oppose any shearing forces being applied to the teeth 14 during the driving or driven operation of the belt construction 10 in a manner that is well known in the art.

If desired, a conventional reinforcing fabric material 36 can be utilized to cover the opposed sides 18 and 19 of each tooth 14 as well as cover the bottom surfaces 37 of each tooth 14 and the bottom surface 38 of each land area 20 as illustrated in FIG. 1.

It has been found according to the teachings of this invention that the belt construction 10 illustrated in FIG. 1 and previously described can be formed by utilizing a method and apparatus similar to the method and apparatus disclosed and described in the aforementioned U.S. Pat. No. to Skura, 3,078,206 and the aforementioned U.S. Pat. No. to Miller, 3,535,946 whereby these two patents are being incorporated into this disclosure by this reference thereto.

For example, reference is now made to FIGS. 2 and 3 wherein the method and apparatus of this invention for making the belt construction 10 of FIG. 1 is generally indicated by the reference numeral 40 and comprises a drum 41 that has a plurality of longitudinally disposed and spaced apart parallel grooves 42 therein and in which the teeth 14 of the belt construction 10 are subsequently formed.

The grooved drum 41 is formed and operated substantially in the same manner as set forth in the aforementioned patent to Skura, U.S. Pat. No. 3,078,206 and therefore the details thereof need not be set forth.

However, when forming the belt construction 10 of this invention, the stretchable fabric cover 36 is first disposed about the drum 41 with the opposed ends of the fabric cover 36 either being butt joined or overlapped as desired with the butt joint or overlapping joint of the fabric material 36 taking place along an ungrooved portion 43 of the drum 41 in a conventional manner.

Figure 2:
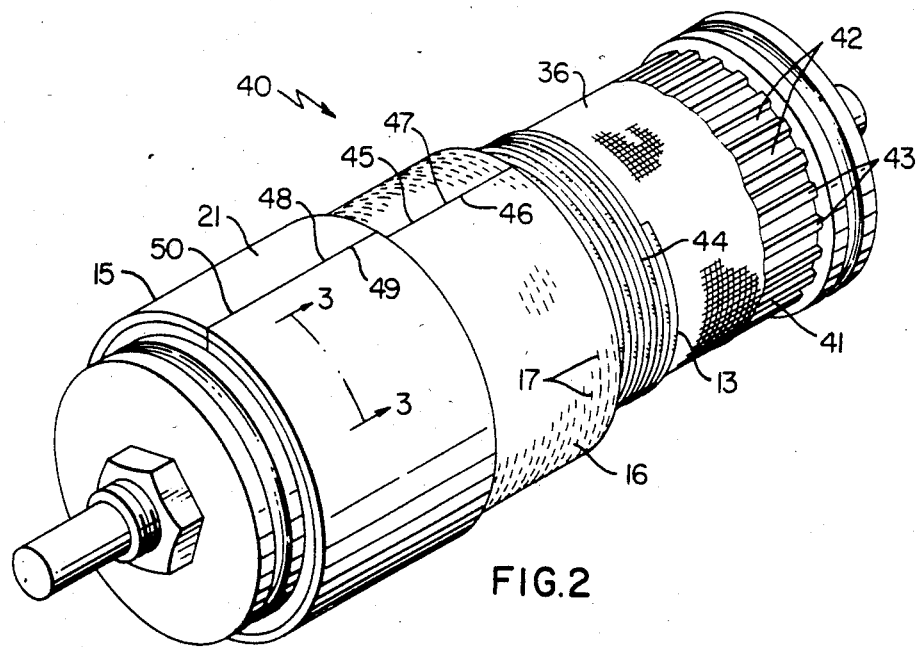
FIG. 2 is a schematic broken away perspective view illustrating the apparatus and method of this invention for forming the belt construction of FIG. 1.

Thereafter, the tensile member 13 is disposed on top of the fabric covering 36 by suitably winding one or more cords on the fabric covering with adjacent turns 44 of the tensile member 13 being spaced from each other the desired distance or combinations of distances, FIG. 2 merely being a schematic showing of such spacing which will permit the polymeric material 16 and 21 to exude therethrough.

Thereafter, a layer of the first polymeric material 16 is disposed about the drum 41 on top of the tensile member 13 and has the opposed ends 45 and 46 thereof disposed in abutting relation as represented by the butt line 47 in FIG. 2.

While the fibers 17 in the polymeric material 16 can be randomly and homogeneously disposed therein, it is also possible that the fibers 17 could be oriented throughout the material 16 and in the embodiment illustrated in FIGS. 1 and 2, the fibers 17 in the material 16 have been oriented so that their long dimensions will mainly extend in a direction between the opposed sides 18 and 19 of each tooth 14 as illustrated in FIG. 1 and therefore are disposed in a direction that is transverse to the longitudinal direction of the drum 41 as illustrated in FIG. 2.

Thereafter, a layer of the second polymeric material 21 is disposed about the drum 41 on top of the first polymeric material 16 with the layer of polymeric material 21 having the opposed ends 48 and 49 thereof disposed in abutting relation as represented by the butt line 50 in FIG. 2.

Figure 3:
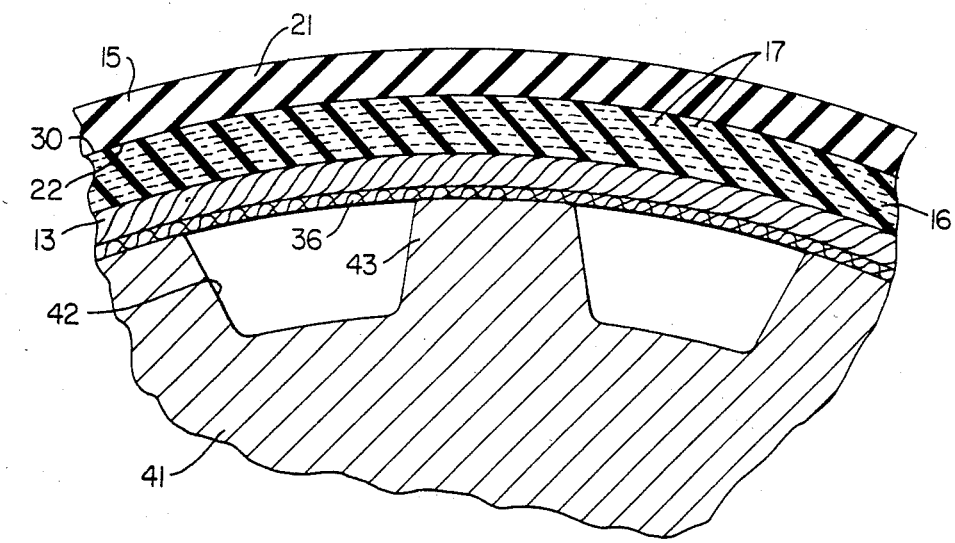
FIG. 3 is an enlarged fragmentary cross-sectional view taken on line 3—3 of FIG. 2, FIG. 3 illustrating one step in the method of this invention for forming the belt construction of FIG. 1.
Figure 4:
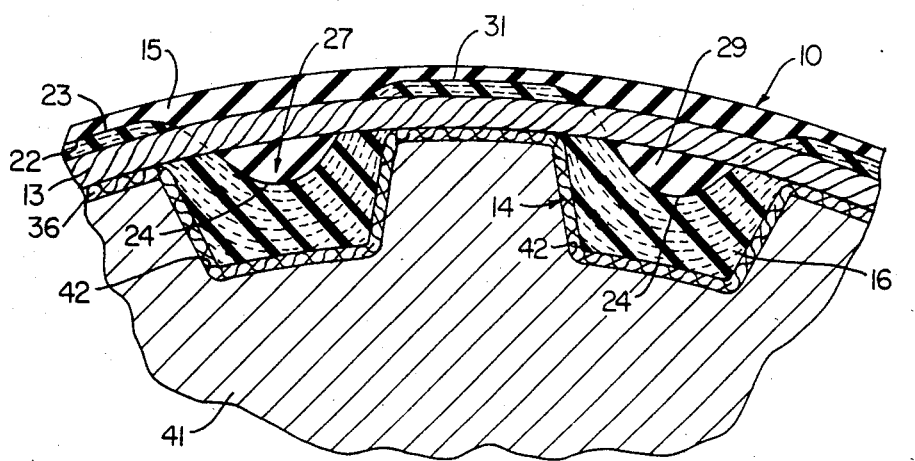
FIG. 4 is a view similar to FIG. 3 and illustrates another step in the method of this invention for forming the belt construction of FIG. 1.

After the parts 36, 13, 16 and 21 of the belt construction 10 have been disposed in the wrapped around condition on the drum 42 as illustrated in FIGS. 2 and 3, a collapsible jacket (not shown) is disposed around the same and the jacket wrapped drum 41 is disposed in a pressure chamber wherein heat and pressure are applied against the surrounding jacket, as well as inside the drum 41, to not only heat the material 36, 13, 16 and 21, but also to force the material 16 and 21 toward the drum 41 in such a manner that the material 16 and 21 will form a belt sleeve, from which the individual belt constructions 10 can be subsequently cut, in the manner illustrated in FIG. 4 by having the covering material 36 stretched and forced into the grooves 42 to outline the grooves 42 of the drum 41 as the heated material 16 exudes through the tensile member 13 and substantially fills the grooves 42 together with the part 29 of the material 21 that also exudes through the tensile member 13 to complete the medial portion 27 of each tooth 14 in the manner illustrated in FIG. 4.

Such heating and compressing of the material 21 and 16 causes the interface lines 24 and 31 to form in the manner previously described and for the previously described purpose as well as to cure and secure the initially separate and uncured materials 16, 21 and 36 into a completed belt sleeve as is well known in the belt making art.

Thus, it can be seen that the method and apparatus set forth in the aforementioned U.S. Pat. No. to Skura, 3,078,206 can be utilized to form the belt construction 10 of this invention by uniquely disposing the layers 36, 13, 16 and 21 around the drum 41 and then applying heat and pressure to form the belt sleeve which will be cured in the condition illustrated in FIG. 4 so that individual belts 10 can be subsequently cut from the resulting belt sleeve before or after the same has been removed from the drum 41 in a manner well known in the art.

As previously stated, any suitable polymeric material or materials can be utilized for forming the layers 16 and 21 as well as any suitable fiber material or materials can be utilized for the fibers 17 that are disposed in the material 16.

For example, the polymeric material 16 can comprise a high Mooney fiber-loaded elastomeric material, such as a neoprene rubber loaded with non-metallic organic fibers that have a diameter in the approximate range of 0.001 to 0.050 of an inch and a length in the approximate range of 0.001 of an inch to as much as one inch, and wherein the material 16 has a Mooney ML/+4 rating of approximately 40 to 50 at 210° F. and a Garlock Flow Index rating of 7 to 8 cm when forced through a 0.100 of an inch orifice with a pressure of 2,000 psi and while at a temperature of approximately 275° F.

In such example for the material 16, it is preferred that the outer polymeric material 21 comprises a gum rubber having a Mooney ML/+4 rating of approximately 80 to 100 at 212° F. and a Garlock Flow Index of approximately 30 to 40 mm when being forced through the 0.100 orifice with a pressure of 2,000 psi while at a temperature of 275° F.

It has also been found according to the teachings of this invention that the material 16 that forms the main portion of the teeth 14 of the belt construction 10 can initially comprise two different and separate layers of fiber loaded polymeric material.

Figure 5:
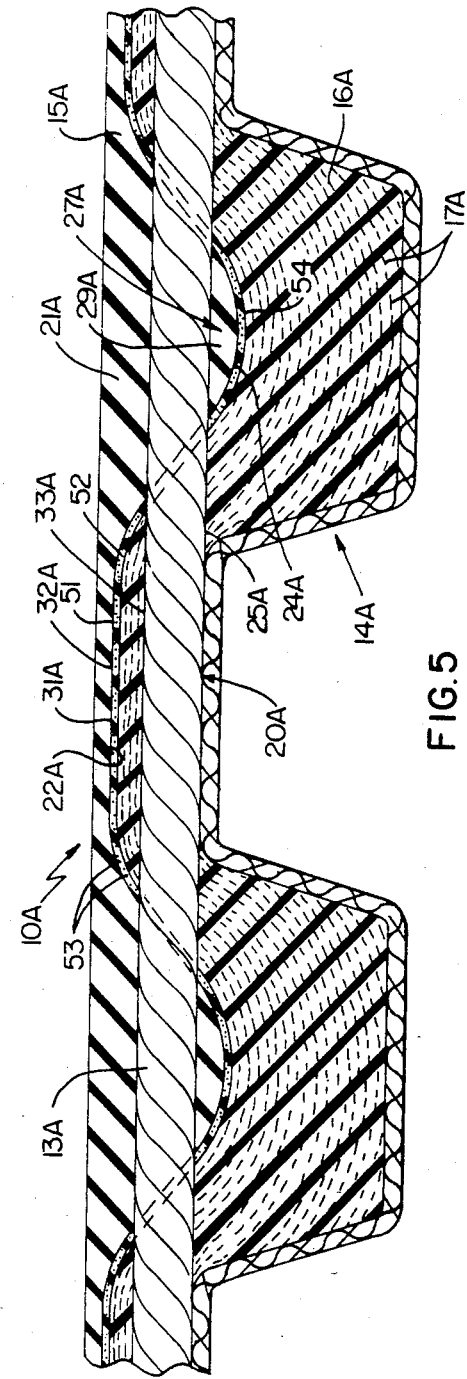
FIG. 5 is a view similar to FIG. 1 and illustrates another embodiment of the belt construction of this invention.

For example, reference is now made to FIG. 5 wherein another embodiment of the belt construction of this invention is generally indicated by the reference numeral 10A and parts thereof that are similar to like parts of the belt construction 10 of FIG. 1 previously described are indicated by like reference numerals followed by the reference letter "A".

As illustrated in FIG. 5, the belt construction 10A is substantially the same as the belt construction 10 previously described except that an additional layer 51 of polymeric material 52 is disposed intermediate the polymeric material 16A and the polymeric material 21A of the backing member 15A, the layer 51 of polymeric material 52 having fibers 53 therein with the fibers 53 being oriented in a direction different than the direction of orientation of the fibers 17A in the material 16A.

Figure 6:
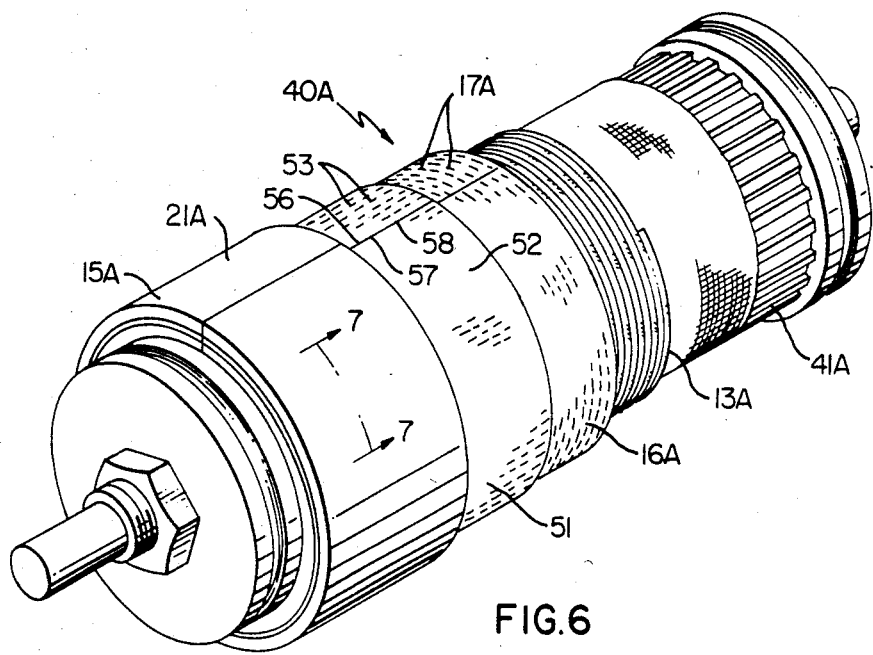
FIG. 6 is a view similar to FIG. 2 and illustrates the method and apparatus of this invention for forming the belt construction of FIG. 5.

For example, as illustrated in FIG. 6, the fibers 53 in the layer 51 can be oriented so that the direction of the long dimensions thereof is substantially parallel to the axis of the drum 41A so as to be disposed substantially at a right angle relative to the direction of the long dimensions of the oriented fibers 17A of the material 16A.

However, it is to be understood that the fibers 53 and/or 17A need not be oriented or can be oriented in a different direction or directions than illustrated, if desired.

Figure 7:
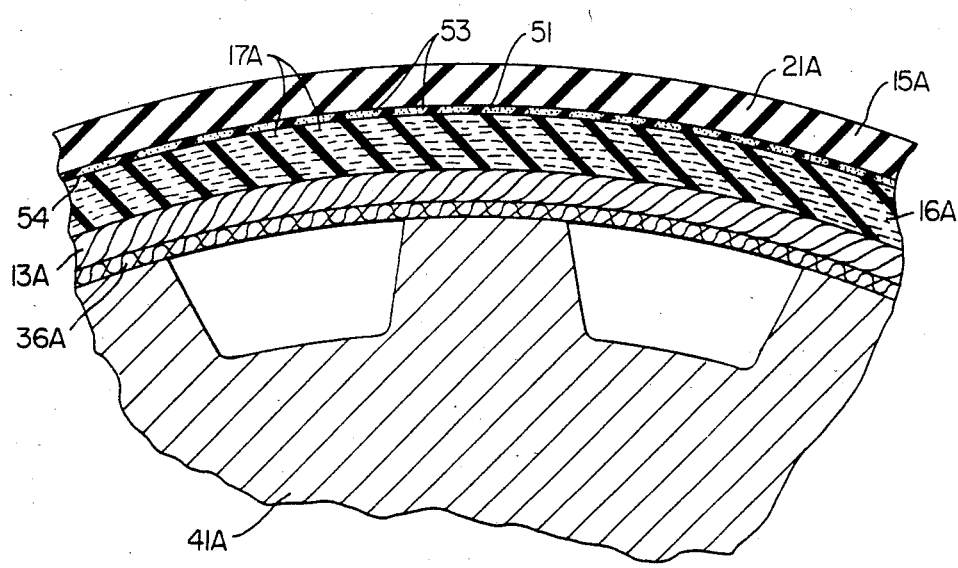
FIG. 7 is an enlarged, fragmentary cross-sectional view taken on line 7—7 of FIG. 6, FIG. 7 being a view similar to FIG. 3 and illustrating one step in the method of this invention for forming the belt construction of FIG. 5.
Figure 8:
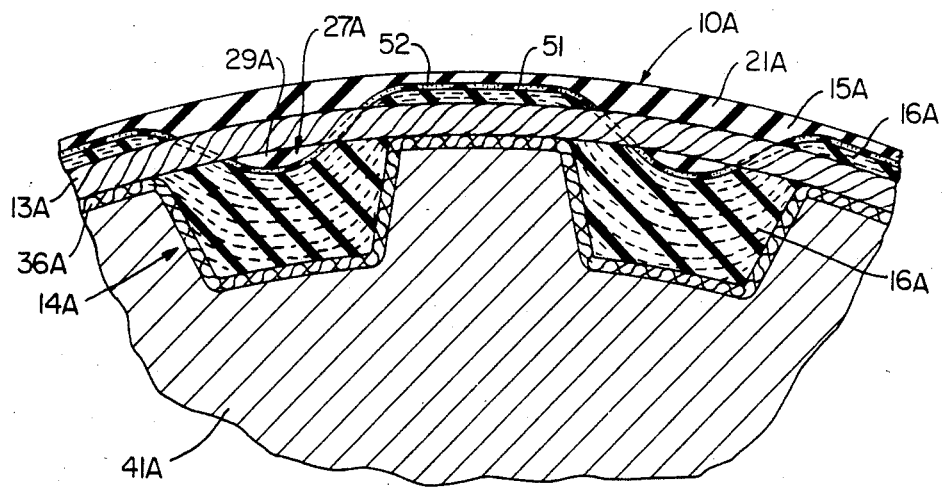
FIG. 8 is a view similar to FIG. 7 and illustrates another step in the method of this invention for forming the belt construction of FIG. 5.

In any event, the polymeric materials 16A and 52 exude in unison through the tensile member 13A during the forming of the belt construction 10A as illustrated in FIGS. 7 and 8 so that the material 52 defines the interface lines 24A and 31A with the surface 22A of the second polymeric material 21A in the manner previously described, the polymeric material 52 likewise forming a similar interface line 54 with the material 16A as illustrated.

It has been found that when utilizing the two materials 52 and 16A in forming the belt construction 10A, the amount of material 21A of the backing layer 15A that forms the part 29A of the medial portion 27A of each tooth 14A is less than the amount of the part 29 of the material 21 of the backing member 15 that forms each tooth 14 of the belt construction 10.

Nevertheless, the resulting interface line 24A is still disposed spaced from the surface 25A of the tensile member 13A while in the land area 20A, the portion 32A of the interface line 31A is disposed spaced from the side 33A of the tensile member 13A. Likewise, the majority of the interface line 54 between the materials 52 and 16A is disposed spaced from the side 25A of the tensile member 13A in the teeth 14A and spaced from the side 33 of the tensile member 13A in the land areas 20A so as to tend to prevent shearing between the interface lines 24A, 31A and 54 at the tensile member 13A for the reasons previously set forth.

The belt construction 10A is made in substantially the same manner as the belt construction 10 previously described whereby the parts of the apparatus 40A illustrated in FIGS. 6, 7 and 8 that are similar to the apparatus 40 of FIGS. 2, 3 and 4 are indicated by like reference numerals followed by the reference letter "A".

As illustrated in FIGS. 6 and 7, it can be seen that the belt construction 10A is made in the same manner as the belt construction 10 previously described except that the layer 51 of polymeric material is disposed about the layer 16A so that the opposed ends 56 and 57 of the layer 51 are disposed in abutting relation as defined by the butt line 58 in FIG. 6. Thereafter, the layer 15A is disposed on top of the layer 51 in the manner previously described.

When the material for the layers 16A and 15A is the same as the previously set forth example for the layers 16 and 15 of the belt construction 10, and the additional thin layer 51 of fiber-loaded material 52 is the same as the material of the layer 16A except that the fibers 53 thereof have been oriented in a direction at right angles to the fibers 17A of the material 16A, it has been found that the apparatus 40A illustrated in FIG. 6 can be initially subjected to an outside steam pressure of approximately 120 psi with 0 psi inside pressure for approximately one-half a minute to allow the outside pressure to build up enough to seal the cure jacket (not shown) that is disposed about the drum assembly 40A illustrated in FIG. 6. At this time, and for approximately a period of four and a half minutes, the outside steam pressure is maintained at approximately 120 psi while the inside steam pressure of the drum 41 is increased to approximately 30 psi. The inside steam pressure provides for controlled warming up of the heavy layer of material 16A to approximately 205° to 215° F. After the flow through the tensile member 13A is presumed to be complete under 0 psi inside pressure and the material 16A and 52 is partially cured at a cure temperature of approximately 250° F. so that the material 16A and 52 will not spring back leaving unformed teeth, the inside pressure is brought from 0 psi to approximately 70 psi and the final cure of the formed belt sleeve is performed.

It is found that the gum rubber that forms the layers 15 and 15A of the belts 10 and 10A in the above examples has a lower flow rate than the fiber-loaded layers 16 and 16A and 51 through the tensile members 13 and 13A while eliminating the tendency for the belt constructions 10 and 10A to flex crack on the outer side thereof.

Therefore, it can be seen that this invention not only provides improved belt constructions, but also this invention provides improved methods of making such belt constructions.

While the forms and methods of this invention now preferred have been illustrated and described as required by the Patent Statute, it is to be understood that other forms and method steps can be utilized and still fall within the scope of the appended claims.

What is claimed is:

1. In a method of making a belt construction having opposed sides and comprising a tensile member intermediate said opposed sides, a plurality of teeth defining one of said opposed sides of said belt construction and being mainly formed of a first polymeric material that has reinforcing fibers disposed substantially homogeneously therein, each tooth having opposed sides that are disposed in spaced relation to adjacent sides of adjacent teeth, and a backing member defining the other of said opposed sides of said belt construction, said backing member being mainly formed from a second polymeric material that is initially separate from said material of said teeth, said material of said backing member having a surface that joins with a surface of each tooth whereby said joining surfaces define an interface line therebetween, said interface line for each tooth extending from said tensile member at a point inboard of one of said opposed sides of the respective tooth into the medial portion of said respective tooth and then back to said tensile member at a point inboard of the other of said opposed sides of said respective tooth whereby part of said material of said backing member defines part of the medial portion of each tooth, the improvement comprising the steps of providing a grooved drum, disposing said tensile member about said drum, then disposing said first polymeric material about said tensile member, then disposing said second polymeric material about said first polymeric material whereby said second polymeric material is still separate from said first polymeric material, and then subjecting said drum to heat and pressure to cause said first and second materials to be forced toward said drum whereby said first material exudes through said tensile member adjacent said grooves and into said grooves and said second material exudes through said tensile member adjacent said grooves and into said grooves to define said interface line for each tooth and whereby said first and second materials form said interface line in each land area to have a portion thereof disposed spaced from said tensile member on the side thereof opposite to the side thereof that faces toward said teeth.

2. A method of making a belt construction as set forth in claim 1 and including the step of disposing a fabric layer about said drum before said step of disposing said tensile member whereby said fabric layer covers said opposed sides of each tooth.

3. A method of making a belt construction as set forth in claim 1 and including the step of forming said first polymeric material to comprise two separate layers of superimposed polymeric material disposed about said drum with said fibers thereof being disposed substantially homogeneously in the respective layer and which layers remain separate from each other until the step of subjecting said drum to heat and pressure.

4. A method of making a belt construction as set forth in claim 3 and including the step of forming one of said two layers of said first polymeric material to be thinner than the other layer thereof.

5. A method of making a belt construction as set forth in claim 4 and including the step of forming said one layer of said first polymeric material to be a different polymeric material than the polymeric material of said other layer thereof.

6. A method of making a belt construction as set forth in claim 3 and including the steps of orienting said fibers in one of said two layers so as to be substantially disposed in a first direction, and orienting said fibers in the other of said two layers so as to be substantially disposed in a second direction that is different than said first direction.

7. A method of making a belt construction as set forth in claim 6 and including the step of causing said first direction to be approximately at a right angle to said second direction.

8. A method of making a belt construction as set forth in claim 7 and including the step of causing said first direction to be a direction that extends generally between said opposed sides of each tooth.

9. A method of making a belt construction as set forth in claim 8 and including the step of forming said other layer to define said interface line with said second material and be thinner than said one layer.

10. A method of making a belt construction as set forth in claim 1 and including the step of forming said first polymeric material to have a greater flow rate through said tensile member than the flow rate of said second polymeric material through said tensile member and be a polymeric material that is different from the polymeric material of said second material.

11. A method of making a belt construction as set forth in claim 10 and including the step of disposing a fabric layer about said drum before said step of disposing said tensile member whereby said fabric layer covers said opposed sides of each tooth.

12. A method of making a belt construction as set forth in claim 10 and including the step of forming said first polymeric material to comprise two separate layers of superimposed polymeric material disposed about said drum that remain separate from each other until the step of subjecting said drum to heat and pressure and which have said fibers thereof disposed substantially homogeneously in the respective layer.

* * * * *